May 10, 1932.  L. F. NENNINGER  1,857,162
MILLING MACHINERY
Original Filed June 7, 1924   2 Sheets-Sheet 1

Inventor
Lester F. Nenninger
By A. K. Parsons
Attorney

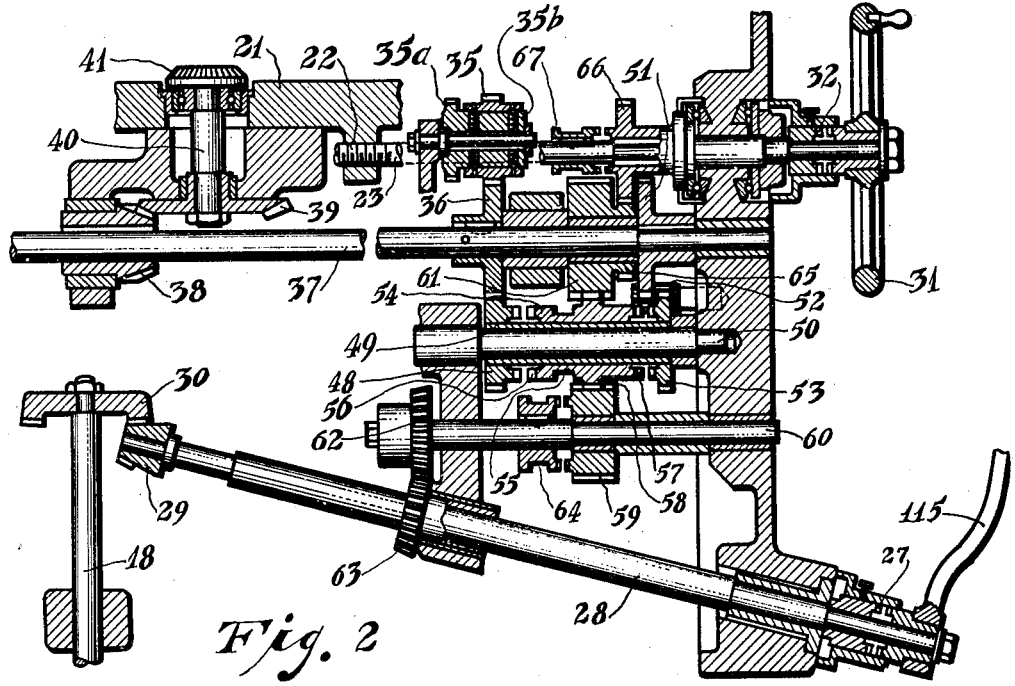

Patented May 10, 1932

1,857,162

UNITED STATES PATENT OFFICE

LESTER F. NENNINGER, OF CINCINNATI, OHIO, ASSIGNOR TO THE CINCINNATI MILLING MACHINE COMPANY, OF CINCINNATI, OHIO, A CORPORATION OF OHIO

MILLING MACHINERY

Original application filed June 7, 1924, Serial No. 718,640. Patent No. 1,747,903, dated February 18, 1930. Divided and this application filed February 13, 1930. Serial No. 428,176.

This invention relates to improvements in milling machines and more particularly to the transmission for effecting the operation thereof.

As illustrated, it is shown applied to a milling machine, of what is commonly termed the knee and column type—that is to say, a machine having a rigid column in combination with a vertically movable knee or work supporting member, which slidably supports a transversely movable saddle, on which is mounted a longitudinally shiftable work table, although it will be understood that it is equally applicable to other types of machines in which the relative adjustment of cutter and work, one toward the other, and of translation one with respect to the other, is effected in part by a movement of the work and in part by a bodily movement of the cutter itself.

An important feature in connection with machinery of this type, for example, is that the transmission gearing or mechanism be as compactly designed as possible, facilitating the utilization of proportionately large and heavy gears compatible with the space available for mounting thereof and capable of actuation by simplified control mechanism readily available to the operator, irrespective of the particular setting of the transmission desired.

Broadly speaking, the invention contemplates the provision, in connection with a milling machine or the like having a work support and a cutter or cutter support, of a plurality of relatively movable support units interposed between the cutter and work for effecting relative movement of the one toward the other for either positioning or feeding, coupled with relative translation in one or more planes for proper machining of a transmission line, a power drive mechanism therefor, an independent branch line therethrough having independent start, stop and reverse mechanism for controlling one of the shiftable units, a common reverser and control for certain of the other movements of the units, and means for selectively connecting the final movement of either of said other units with the power line and reverser.

In the drawings is shown a conventional type of milling machine embodying the generic principles and accomplishing the desirable results above referred to, but it is to be understood that the present mechanism is capable of application to other types of machine tools or the like, and that I may make any modifications in the specific details of construction and combination and arrangements of parts hereinafter described, within the scope of the appended claims, without departing from or exceeding the spirit of the invention.

Figure 2 is a semi-diagrammatic development of the transmission illustrating the coupling thereof with the several units shiftable thereby.

Figure 3 is a fragmentary section illustrating the reverse clutch mechanism for controlling the direction of movement of the work support.

Figure 1:
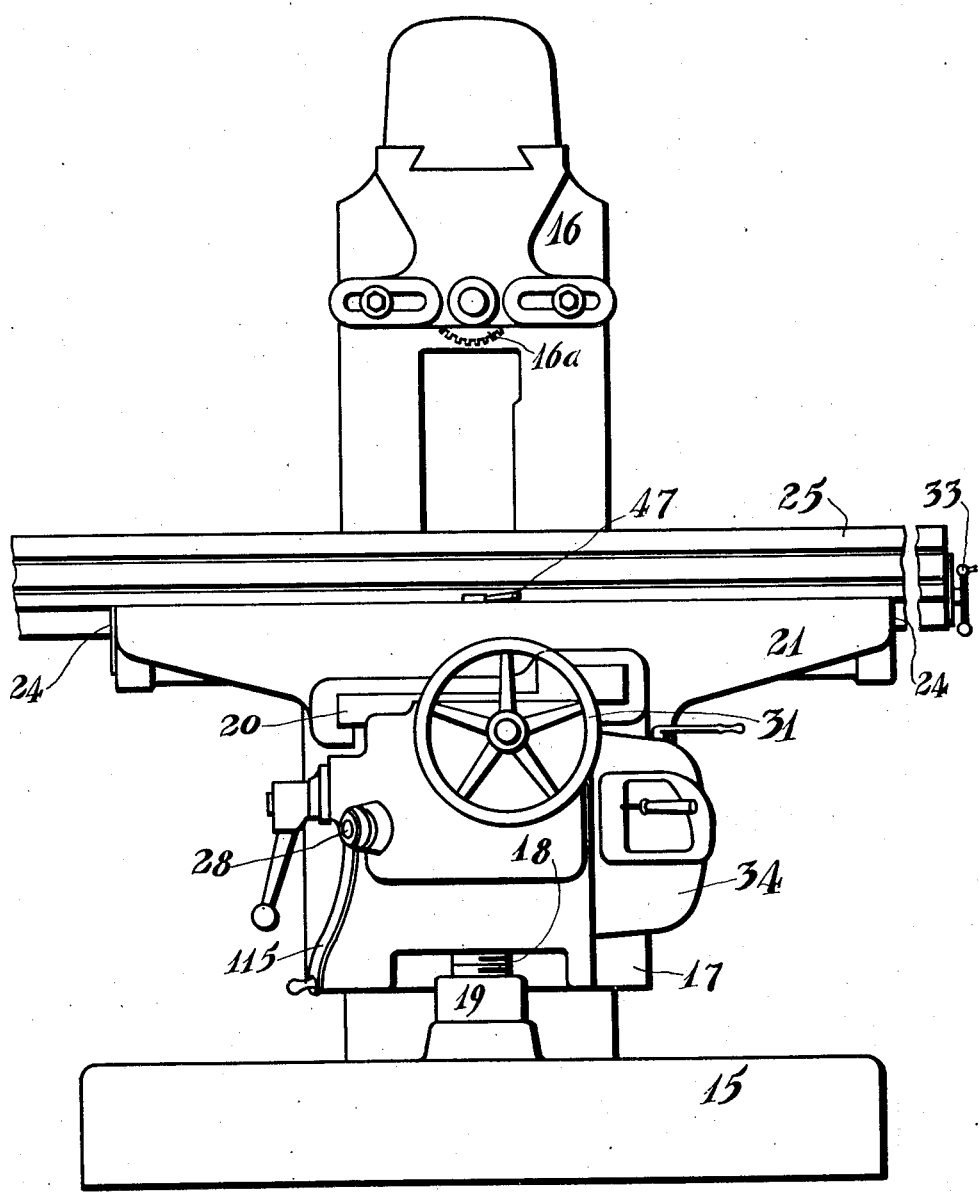
Figure 1 is a front view of a milling machine embodying these improvements.

In the drawings, in which similar characters of reference are employed to denote corresponding parts throughout the several views, the numeral 15 designates the base of a milling machine having rising therefrom a column 16, for suitable fixed or adjustable support of the milling cutter 16a and an underlying support unit shown as a slidably mounted knee 17. Adjusting screw 18, carried by the knee and operating in a nut portion 19 rising from the base 15, serves to vary the vertical separation of the support unit as respects the cutter. The knee is provided with transverse slideways 20, on which is movable the saddle 21, shiftable by suitable mechanism including a final mover, illustrated as an adjusting screw portion 22 on shaft 23 in suitable threaded engagement with the saddle as indicated in Figure 2. This saddle in turn is formed with the guides 24 for the work support table 25 whose final mover is shown in the form of an adjusting screw 26.

It is to be understood that these parts may be of any conventional type and any other form of final mover substituted for the one here particularly shown. It will be seen that the machine tool to which the present invention is applied comprises essentially a work support, a cutter, and a plurality of shiftable members intervening between said parts to effect substantially universal relative adjustment thereof.

The essential movements just referred to are ordinarily capable of both hand and power adjustment, the hand adjustment devices including the crank arm or handle 115 coupleable by clutch 27 with shaft 28 which, through bevel pinion 29 and gear 30 controls the elevation varying screw 18. The hand wheel 31 is coupleable through clutch 32 with shaft 23 to rotate this shaft and its feed screw, while the handle 33, at the end of the table, serves for actuation of table adjusting screw and shaft 26.

The power actuation of the parts in question will be best understood by reference to Figure 2. Provided on a suitable portion of the machine, as the knee 17, is the speed box 34, to which power from a prime mover is suitably applied, this speed box serving to vary the driving speed of the shift mechanisms as a whole and having as a part of its power transmission train, the drive gear 35a which, through safety clutch 35b, drives pinion 35 in mesh with transmission gear 36 which is keyed on spline shaft 37, which is the final common driver for the several power movements of the machine.

This shaft projects inward toward column 16 forming a branch transmission to one part, such as the table, and has slidably splined thereon the pinion 38 meshing with gear 39 on shaft 40, these parts being rotatably journaled in a depending bracket on saddle 21. Shaft 40 bears at its upper end the bevel gear 41 meshing with the pair of pinions 42 and 43 rotatably mounted in the saddle and having central bores loosely receiving shaft 26. These pinions, it will be understood, are driven in opposite directions. Slidably keyed to shaft 26 intermediate the pinions, is an actuation and direction controlling clutch spool 44 having clutch surfaces 45 and 46 for selective engagement with coacting clutch portions on the pinions 42 and 43. The position of this clutch spool is regulated by shift lever 47 on the front of the saddle which may be shifted to put the clutch spool in the neutral position indicated, or shifted to either right or left to engage the spool with the corresponding pinion to drive the table to the right or left as may be desired.

Referring now to the main transmission lines shown in developed form in Figure 2, the gear 36 meshes with gear 48 rotatably mounted on bushing sleeve 49 carried by the stub shaft or spindle 50, so that gear 48 is constantly driven during operation of the power transmission line. A second gear 51 is also secured on and constantly driven with shaft 37 and serves, through reverser pinion 52 constantly to drive gear 53 on bushing 49 in the opposite direction from that in which gear 48 rotates. Disposed intermediate gears 48 and 53 is the interponent reverser sleeve 54 having the shifter groove 55 and the clutch portions 56 and 57 at opposite ends for selective engagement with co-acting clutch faces on gears 48 and 53. In intermediate or neutral position the sleeve is out of engagement with both of the clutch members, but it may be shifted as desired for selective engagement with either, being driven in opposite directions according to the gear member with which its clutch face is meshed. The member 54 has the intermediately located peripheral gear portion 58 in driving engagement with gear 59 on shaft 60 and gear 61 rotatably supported by shaft 37. It will be noted that the gears 59 and 61 are of the wide face type and correspondingly located so that the gear portion of sleeve 54 will remain in proper driving mesh with said gears in any axially adjusted position of the sleeve.

Shaft 60 is provided with gear 62 meshing with gear 63 on shaft 28 to operate said shaft and, through gears 29 and 30, control vertical movement of the knee of the machine and is adapted to be operatively connected with transmission gear 59 by clutch spool 64.

Gear 61 has formed integral therewith, the reduced pinion portion 65 meshing with gear 66 loosely carried by shaft 23. A clutch spool member 67 keyed on shaft 23 is capable of shifting movement to operatively connect and disconnect the shaft with gear 66 for in and out adjustments of the saddle member with respect to the knee.

By use of the transmission thus described, it will be noted that an extremely compact structure is produced which will occupy minimum space in the knee or other supporting unit for the transmission and at the same time will provide a transmission for effecting individual drive to three distinct units. Not only is a drive for three units provided but, at the same time, a common intermediate combined drive and reversing mechanism utilized effective as respects two of the three unit drives. Also, by the provision of the direct drive to shaft 60 a coupling therefrom to the under side of bevel gear 30 combined with the intermediate gear drive from member 61 to screw 23, both of these screws will be rotated in a common direction for a given setting of the reverser, so that corresponding movements of the supports as respects the cutter will be connected—that is to say either a movement up or in of the work piece for one setting of the reverser or a down or out movement for the other setting of the reverser member. Attention is further invited to the fact that in the gear arrangement illustrated, member 23 is rotated at a much more rapid rate than is member 18 and that consequently means have been provided in this transmission for imparting to the final mover for one of the parts a drive at a considerably reduced rate as respects the final mover for the other of said parts.

It will be understood that any suitable mechanism may be utilized for shifting of the reverser sleeve 54 from the neutral position illustrated, to other effective position, and that likewise any suitable and desired form of clutch shifter mechanism may be utilized for shifting of spool 64 and for shifting of spool 67, and that these may be coupled, as desired, for either joint or individual actuation. One form of control mechanism for support movements, which is suitable for utilization in connection with this specific transmission, has been disclosed and claimed in my co-pending application Serial 718,640, filed June 7, 1924, now Patent Number 1,747,903, issued February 18, 1930, of which the present application is a division and it is therefore believed that further specific description or illustration of this available type of controls is unnecessary in the present instance.

I claim:

1. In a machine tool organization embodying a plurality of relatively movable parts, the combination with independent final movers for each of said parts, of a power transmission coupleable with said final movers, said transmission including gearing individual for movement of certan of the parts and an interponent sleeve member having a gear portion in joint engagement with portions of said individual gearing, and means for driving said sleeve in opposite directions for jointly reversing the direction of actuation of the gearing in engagement therewith.

2. In a machine tool organization embodying a plurality of relatively movable parts, the combination with independent final movers for each of said parts, of a power transmission coupleable with said final movers, said transmission including gearing individual for movement of certain of the parts and an interponent sleeve member having a gear portion in joint engagement with portions of said individual gearing, means for driving said sleeve in opposite directions for jointly reversing the direction of actuation of the gearing in engagement therewith, and means for selectively operatively associating the final movers for the parts with the particular drive gearing individual thereto.

3. In a mechanism of the character described the combination with a plurality of relatively movable parts, of final movers individual to each of said parts, power transmission means for said final movers including gear units individual respectively to selected final movers disposed in peripheral proximity and an interponent sleeve member having a gear portion in joint mesh with said first named gear units, a power input for the transmission, and means selectively available for coupling the sleeve with the power input portion of the transmission for rotation in opposite directions whereby to reverse the direction of actuation of the gears of the individual final mover transmissions respectively in engagement therewith.

4. In a mechanism of the character described the combination with a plurality of relatively movable parts, of final movers individual to each of said parts, power transmission means for said final movers including gear units individual respectively to selected final movers disposed in peripheral proximity and an interponent sleeve member having a gear portion in joint mesh with said first named gears, a power input for the transmission, means selectively available for coupling the sleeve with the power input portion of the transmission for rotation in opposite directions whereby to reverse the direction of actuation of the gears of the individual final mover transmissions respectively in engagement therewith, a branch transmission line extending from the power input portion of the transmission for uni-directional actuation thereby, a final mover associated therewith, and means for reversing the direction of movement of the final mover as respects the uni-directional actuation of said last mentioned branch transmission line.

5. In a knee and column type milling machine in combination with a movable knee, saddle and table, of final movers for each of said parts, a power actuating means coupleable with each of said final movers, said coupling connection including a joint transmission line for two of said parts terminating in a pair of co-spaced, co-axial oppositely driven gear members having opposed clutch faces and a sleeve member intermediate said gears having terminal clutch portions selectively engageable with the one or the other of the clutch faces of the gears for actuation of the sleeve therefrom in opposite directions, said sleeve having a peripheral gear portion, a pair of branch transmissions terminating in gear units individually meshing with said sleeve gear whereby axial shifting of the sleeve will control the directional actuation of both of said gears and thus of the transmissions associated therewith.

6. In a knee and column type milling machine in combination with a movable knee, saddle and table, of final movers for each of said parts, a power actuating means coupleable with each of said final movers, the coupling connection including a joint transmission line for two of said parts terminating in a pair of co-spaced, co-axial oppositely driven gear members having opposed clutch faces and a sleeve member intermediate said gears having terminal clutch portions selectively engageable with the one or the other of the clutch faces of the gears for actuation of the sleeve therefrom in opposite directions, said sleeve having a peripheral gear portion, a pair of branch transmissions terminating in gear units individually meshing with said sleeve gear whereby axial shifting of the sleeve will control the directional actuation of both of said gears and thus of the transmissions associated therewith, and individual means for determining the operative connection or disconnection of an individual gear with its individual branch transmission.

7. In a knee and column type milling machine in combination with a movable knee, saddle and table, of final movers for each of said parts, a power actuating means coupleable with each of said final movers, said coupling connection including a joint transmission line for two of said parts terminating in a pair of co-spaced, co-axial oppositely driven gear members having opposed clutch faces and a sleeve member intermediate said gears having terminal clutch portions selectively engageable with the one or the other of the clutch faces of the gears for actuation of the sleeve therefrom in opposite directions, said sleeve having a peripheral gear portion, a pair of branch transmissions terminating in gear units individually meshing with said sleeve gear whereby axial shifting of the sleeve will control the directional actuation of both of said gear units and thus of the transmissions associated therewith, individual means for determining the operative connection or disconnection of an individual gear with its individual branch transmission, and an additional branch transmission operatively effective independent of the clutch sleeve for uni-directional actuation.

8. In a knee and column type milling machine in combination with a movable knee, saddle and table, of final movers for each of said parts, a power actuating means coupleable with each of said final movers, said coupling connection including a joint transmission line for two of said parts terminating in a pair of co-spaced, co-axial oppositely driven gear members having opposed clutch faces and a sleeve member intermediate said gears having terminal clutch portions selectively engageable with the one or the other of the clutch faces of the gears for actuation of the sleeve therefrom in opposite directions, said sleeve having a peripheral gear portion, a pair of branch transmissions terminating in gear units individually meshing with said sleeve gear whereby axial shifting of the sleeve will control the directional actuation of both of said gear units and thus of the branch transmissions associated therewith, individual means for determining the operative connection or disconnection of an individual gear unit with its individual branch transmission, an additional branch transmission operatively effective independent of said clutch sleeve for uni-directional actuation, a final mover operative from said last mentioned transmission, and means for determining the operative and directional actuation of the part for uni-directional constant actuation of its branch transmission.

9. A mechanism of the character described including a vertically movable knee and transversely movable saddle, final movers for both of said members, power transmission mechanism including an intermediate reverser sleeve selectively actuable in opposite directions of rotation and having a peripheral gear portion, a pair of gear units driven from said sleeve gear portion, and clutch members for selectively coupling the final movers with individual sleeve driven gears for selectively producing movement of the knee or saddle in the direction of movement determined by the direction of rotation of the sleeve.

10. A compact drive transmission for effecting selected relative movements of a plurality of relatively shiftable parts of a machine tool organization including a power input member, a first shaft operatively associated with said input member for uni-directional actuation thereby, a first branch transmission for shifting one of said parts including a reverser directly actuable by said unidirectionally operated shaft, said shaft having a pair of gears secured thereon, a parallel shaft unit having a pair of spaced gear members, one in direct mesh with one of the gears on the uni-directional shaft and the other of said gears being reversely driven from the second gear on the uni-directional shaft through the medium of a reverser pinion, an axially adjustable reverser clutch sleeve rotatably supported intermediate said reversely driven gears and having terminal clutch portions for selective inter-engagement with clutch portions on the gears and a central peripheral gear portion, gearing coupled with and actuated by said reverser sleeve in opposite directions of rotation dependent upon the axial adjustment of the sleeve, final movers for the remaining shiftable parts, and clutch members for individually coupling said final movers with the gearing driven from said sleeve.

11. A compact drive transmission for effecting selected relative movements of a plurality of relatively shiftable parts of a machine tool organization including a power input member, a first shaft operatively associated with said input member for uni-directional actuation thereby, a first branch transmission for shifting one of said parts including a reverser directly actuable by said unidirectionally operated shaft, said shaft having a pair of gears secured thereon, a parallel shaft unit having a pair of spaced gear members, one in direct mesh with one of the gears on the uni-directional shaft and the other of said gears being reversely driven from the second gear on the uni-directional shaft through the medium of a reverser pinion, an axially adjustable reverser clutch sleeve rotatably supported intermediate said reversely driven gears and having terminal clutch portions for selective inter-engagement with clutch portions on the gears and a central peripheral gear portion, gearing coupled with and actuated by said reverser sleeve in opposite directions of rotation dependent upon the axial adjustment of the sleeve, final movers for the remaining shiftable parts, and clutch members for individually coupling said final movers with the gearing driven from said sleeve, the gearing to different of said final movers being of different ratio in different transmissions whereby said final movers are actuable at appreciably different rates.

12. In combination with a milling machine including a cutter, a work support and a plurality of interposed relatively movable members intervening between the cutter and work support to permit relative adjustment of the cutter and support and operative traversing thereof, and means for effecting movement of the several units including a driven member, a first shaft having a gear secured thereon in operative engagement with the driven member a second gear secured thereon in spaced relation to the first gear, a reverse pinion meshing with the second gear, a third gear mounted on the shaft for free rotation relative thereto, a second shaft member extending parallel with the first, said member bearing a pinion in mesh with the first mentioned gear and a second pinion operative from the second gear on the first shaft through the medium of a reverser pinion and having an intermediate reverser sleeve having clutch portions at opposite ends thereof for selective engagement with the oppositely actuated pinions, said sleeve having a gear portion intermeshing with the third gear on the first shaft for actuation of said gear in a direction determined by the sleeve and independent of the direction of actuation of the first shaft, a final mover for one of the machine tool units operatively associated with said first shaft, and a final mover for another of said units operatively associated with said last mentioned gear.

13. In combination with a milling machine including a cutter, a work support and a plurality of interposed relatively movable members intervening between the cutter and work support to permit relative adjustment of the cutter and support and operative traversing thereof, and means for effecting movement of the several units including a driven member, a first shaft having a gear secured thereon in operative engagement with the driven member, a second gear secured thereon in spaced relation to the first gear, a reverser pinion meshing with the second gear, a third gear mounted on the shaft for free rotation relative thereto, a second shaft member extending parallel with the first, said member bearing a pinion in mesh with the first mentioned gear and a second pinion operative from the second gear on the first shaft through the medium of a reverser pinion and having an intermediate reverser sleeve having clutch portions at opposite ends thereof for selective engagement with the oppositely actuated pinions, said sleeve having a gear portion intermeshing with the third gear on the first shaft for actuation of said gear in a direction determined by the sleeve and independent of the direction of actuation of the first shaft, a final mover for one of the machine tool units operatively associated with said first shaft, a final mover for another of said units operatively associated with said last mentioned gear, and clutch means for individually determining the operative association of the respective final movers.

14. In combination with a milling machine including a cutter, a work support and a plurality of interposed relatively movable members intervening between the cutter and work support to permit relative adjustment of the cutter and support and operative traversing thereof, and means for effecting movement of the several units including a driven member, a first shaft having a gear secured thereon in operative engagement with the driven member, a second gear secured thereon in spaced relation to the first gear, a reverser pinion meshing with the second gear, a third gear mounted on the shaft for free rotation relative thereto, a second shaft member extending parallel with the first, said member bearing a pinion in mesh with the first mentioned gear and a second pinion operative from the second gear on the first shaft through the medium of a reverser pinion and having an intermediate reverser sleeve having clutch portions at opposite ends thereof for selective engagement with the oppositely actuated pinions, said sleeve having a gear portion intermeshing with the third gear on the first shaft for actuation of said gear in a direction determined by the sleeve and independent of the direction of actuation of the first shaft, a final mover for one of the machine tool units operatively associated with said first shaft, a final mover for another of said units operatively associated with said last mentioned gear, a third shiftable unit, a final mover therefor, and driving connections between said last named final mover and the sleeve and including a clutch whereby shifting of the sleeve will determine the direction of actuation of said last named final mover and the clutch will determine the operative connection of said last mentioned final mover with the sleeve.

15. A mechanism of the character described including a vertically movable knee and a transversely movable saddle, an individual final mover for each of said members and power transmission mechanism for actuation of said individual final movers including a power input member, a reverser, a pair of transmissions extending from the reverser to the individual final movers, and a clutch mechanism in each of said transmissions for controlling the operative connection or disconnection of the final mover with the reverser whereby actuation of the reverser will jointly determine the directional possible actuation of the pair of final movers while actuation of the individual clutches in their transmissions will determine the operative coupling of the knee or saddle for actuation thereof.

16. A mechanism of the character described including a vertically movable knee and a transversely movable saddle, an individual final mover for each of said members and power transmission mechanism for actuation of said individual final movers including a common power input member, a reverser, a pair of branch transmissions extending from the reverser to the individual final movers, and a clutch mechanism in each of said transmissions for controlling the operative connection or disconnection of the final mover with the reverser whereby actuation of the reverser will jointly determine the directional possible actuation of the pair of final movers while actuation of the individual clutches in their transmissions will determine the operative coupling of the knee or saddle for actuation thereof, said reverser having a neutral intermediate position whereby the same may be actuated to jointly disassociate both branch transmissions with the common power actuator therefor.

17. In a milling machine of the knee and column type embodying relatively translatable knee, saddle and table units, a transmission mechanism for power actuation of said several units including final movers individual to each of said units and a power input member common to all of said units, a first branch transmission extending from the power input member to one of the units for unidirectional actuation and including a final reverser for ultimate determination of the directional actuation of its final mover, an intermediate reverser driven by the power input member, a pair of branch transmissions extending from said reverser to the final movers of the other two units for actuation of the units in a direction determined by the adjustment of said reverser, and individual clutch mechanisms in said second and third branch transmissions at a point in each transmission intermediate the reverser and the final mover of the respective transmission for individually determining the operative association of the final mover with the transmission through the reverser.

18. In a milling machine of the knee and column type embodying relatively translatable knee, saddle and table units, a transmission mechanism for power actuation of said several units including final movers individual to each of said units and a power input member common to all of said units, a first branch transmission extending from the power input member to one of the units for unidirectional actuation and including a final reverser for ultimate determination of the directional actuation of its final mover, an intermediate reverser driven by the power input member, a pair of branch transmissions extending from said reverser to the final movers of the other two units for actuation of the units in a direction determined by the adjustment of said reverser, and individual clutch mechanisms in said second and third branch transmissions at a point in each transmission intermediate the reverser and the final mover of the respective transmissions for individually determining the operative association of the final mover with the transmission through the reverser, said intermediate reverser having an intermediate neutral position whereby the same may be shifted to render both the second and third transmissions inactive.

In testimony whereof I affix my signature.

LESTER F. NENNINGER.